(12) United States Patent
Hattori et al.

(10) Patent No.: US 6,917,175 B2
(45) Date of Patent: *Jul. 12, 2005

(54) ROBOT AND JOINT DEVICE FOR THE SAME

(75) Inventors: Yuichi Hattori, Chiba (JP); Yoshihiro Kuroki, Kanagawa (JP); Tatsuzo Ishida, Tokyo (JP); Junichi Yamaguchi, Tokyo (JP)

(73) Assignees: Sony Corporation, Tokyo (JP); Jinichi Yamaguchi, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/413,880

(22) Filed: Apr. 15, 2003

(65) Prior Publication Data

US 2003/0173926 A1 Sep. 18, 2003

Related U.S. Application Data

(63) Continuation of application No. 09/656,292, filed on Sep. 6, 2000, now Pat. No. 6,583,595.

(30) Foreign Application Priority Data

Sep. 7, 1999 (JP) ........................................... 11-253053
Jul. 7, 2000 (JP) ..................................... 2000-206530

(51) Int. Cl.$^7$ ............................................. G05B 19/10
(52) U.S. Cl. ................... 318/567; 318/568.12; 180/8.1; 446/119; 446/175
(58) Field of Search .......................... 318/567, 568.11, 318/568.19, 568.2, 568.12; 901/1; 180/8.1, 8.5, 8.6; 700/245, 258, 85, 95

(56) References Cited

U.S. PATENT DOCUMENTS 5,159,988 A * 11/1992 Gomi et al. .................. 180/8.6
5,176,560 A * 1/1993 Wetherell et al. ........... 446/175

(Continued)

FOREIGN PATENT DOCUMENTS

FR 2807959 A1 * 10/2001 .............. B25J/9/06
WO WO 98 26905 6/1998

OTHER PUBLICATIONS

M. Inaba et al: "A 35 DOF Humanoid That Can Coordinate Arms and Legs in Standing Up, Reaching and Grasping an Object" Proceedings of the 1996 IEEE/RSJ International Conference on Robots and Systems (IROS). Robotic Intelligence Interacting With Synamic Worlds. Osaka, Nov. 4–8, 1996, Proceedings of the IEEE/RSJ International Conference on Robots and Systems (IROS), vol. 1, pp. 29–36, XP000773256 ISBN: 0–7803–3214–8.

Primary Examiner—Paul Ip
(74) Attorney, Agent, or Firm—Frommer Lawrence & Haug LLP; William S. Frommer; Leonard J. Santist

(57) ABSTRACT

A humanoid robot including upper limbs, lower limbs, and a trunk. Hip joints which connect the lower limbs and the trunk each possess degrees of freedom provided in correspondence with a hip joint yaw axis, a hip joint roll axis, and a hip joint pitch axis. The humanoid robot is a leg-movement-type robot which walks on two feet. By arbitrarily offsetting the hip joint yaw axes in a roll axis direction, the effects of the movement of the center of gravity occurring when the mode of use of the robot is changed are accommodated to in order to flexibly balance the weights of the upper and lower limbs. The waist is made more compact in order to form a humanoid robot which is well proportioned and which makes it possible to prevent interference between the left and right feet when the direction of a foot is changed. Accordingly, a robot which moves naturally and in a way sufficiently indicative of emotions and feelings using fewer degrees of freedom is provided.

1 Claim, 15 Drawing Sheets

U.S. PATENT DOCUMENTS

| | | | |
|---|---|---|---|
| 5,282,460 A | * 2/1994 | Boldt | 601/13 |
| 5,343,397 A | * 8/1994 | Yoshino et al. | 701/23 |
| 5,758,734 A | * 6/1998 | Hong et al. | 180/8.1 |
| 5,807,011 A | * 9/1998 | Hong et al. | 403/62 |
| 5,821,415 A | * 10/1998 | Faust et al. | 73/172 |
| 5,841,258 A | * 11/1998 | Takenaka | 318/568.12 |
| 6,089,950 A | * 7/2000 | Lee et al. | 446/376 |
| 6,115,639 A | * 9/2000 | Takenaka | 700/85 |
| 6,131,436 A | * 10/2000 | O'Bannon et al. | 73/7 |
| 6,243,623 B1 | 6/2001 | Takenaka et al. | |
| 6,353,773 B1 | * 3/2002 | Takenaka | 700/245 |
| 6,401,846 B1 | * 6/2002 | Takenaka et al. | 180/8.6 |
| 6,482,063 B1 | * 11/2002 | Frigard | 446/119 |
| 6,505,096 B2 | * 1/2003 | Takenaka et al. | 700/245 |
| 6,564,888 B1 | * 5/2003 | Gomi et al. | 180/8.6 |
| 6,658,962 B1 | * 12/2003 | Rosheim | 74/490.05 |
| 2002/0022907 A1 | * 2/2002 | Takenaka et al. | 700/245 |

* cited by examiner 100
(FRONT SIDE)

100
(BACK SIDE)

ROBOT AND JOINT DEVICE FOR THE SAME

This application is a continuation of application Ser. No. 09/656,292 filed Sep. 6, 2000 now U.S. Pat. No. 6,583,595.

BACKGROUND OF THE INVENTION

1. Field of the Invention

The present invention relates to a realistic robot having a structure which emulates the mechanisms and movements of an organism, and, more particularly, to a leg-movement-type robot having a structure which emulates the body mechanisms and movements of, for example, a human being or a monkey, which walks while it is in an erect posture.

Even more specifically, the present invention relates to a leg-movement-type robot which walks on two feet while it is in an erect posture and which includes what one calls the upper half of the body, including the trunk, the head, the arms, and the like, provided on the legs. Still more specifically, the present invention relates to a robot which can move naturally in a way close to that of a human being and in a way sufficiently indicative of emotions and feelings with considerable fewer degrees of freedom than the actual mechanism of, for example, the human body.

2. Description of the Related Art

A robot is a mechanical device which emulates the movement of a human being by making use of electrical and magnetic actions. The term robot is said to be derived from the Slavic word ROBOTA (slavish machine). In our country, the use of robots began from the end of the 1960s, most of which were industrial robots, such as manipulators and conveyance robots, used, for example, for the purpose of achieving automatic industrial operations in factories without humans in attendance.

In recent years, progress has been made in the research and development of leg-movement-type robots which emulate the movements and mechanisms of the body of an animal, such as a human being or a monkey, which walks on two feet while it is in an erect posture. Therefore, there has been greater expectation for putting such leg-movement-type robots into practical use. A superior feature of leg-movement-type robots which move on two feet while they are in an erect posture is that they can walk flexibly, for example, up and down steps or over obstacles.

In the history of leg-movement-type robots, research regarding leg movement was started by studying as elemental technology leg movement using only the lower limbs. Accordingly, robots of this type are not provided with all parts of the body which are positioned vertically.

For example, Japanese Unexamined Patent Publication No. 3-184782 discloses a joint structure applied to the structural part below the trunk of a robot which walks using the legs.

Japanese Unexamined Patent Publication No. 5-305579 discloses a controller for controlling the walking of a leg-movement-type robot. The controller disclosed in this document controls the walking of the robot so that the ZMP (zero moment point) matches a target value. The ZMP is the point on the floor surface where the moment resulting from the floor reaction force when the robot walks is zero. However, as can be seen from FIG. 1 in this document, a trunk 24 on which the moment acts is formed using a black box, so that not all parts of the body are provided. Therefore, the document is confined to proposing leg movement as elemental technology.

It goes without saying that the ultimate purpose of constructing leg-movement-type robots is to provide these robots with all parts of the body. More specifically, the ultimate purpose is to provide these robots which walk while they are in an erect posture on two feet with the lower limbs used for walking on two feet, the head, the upper limbs (including the arms), and the trunk which connects the upper and lower limbs. In such robots provided with all parts of the body, it is presupposed that work is carried out by moving the two legs while the robots are in an erect posture. In all cases where such work is carried out in the living space of human beings, it is necessary to control the robots so that the upper and lower limbs and the trunk move harmoniously in a predetermined order of priority.

Leg-movement-type robots which emulate the mechanisms and movements of human beings are called humanoid robots. Humanoid robots can, for example, help people in life, that is, help them in various human activities in living environments and in various circumstances in everyday life.

As is conventionally the case, leg-movement-type robots are roughly divided into those for industrial purposes and those for entertainment.

Industrial robots are intended to carry out various difficult operations, such as in industrial tasks or production work, in place of human beings. For example, they carry out in place of human beings maintenance work at nuclear power plants, thermal power plants, or petrochemical plants, or dangerous/difficult work in production plants or tall buildings. The most important theme is to design and manufacture industrial robots so that they can be industrially used as specified and can provide the specified functions. Industrial robots are constructed on the assumption that they walk on two feet. However, as mechanical devices, they do not necessarily have to faithfully reproduce the actual body mechanisms and movements of animals, such as human beings or monkeys, which walk while they are in an erect posture. For example, the freedom of movement of particular parts (such as the finger tips), and their operational functions are increased and enhanced, respectively, in order to produce an industrial robot for a particular use. On the other hand, the freedom of movement of parts considered comparatively unrelated to the use of the industrial robot (such as the head and arms) is limited or such parts are not formed. This causes the industrial robot to have an unnatural external appearance when it works and moves, although it is a type of robot which walks on two feet. However, for convenience in designing such a robot, such a compromise is inevitable.

In contrast, leg-movement-type robots for entertainment provide properties closely connected to life itself, rather than help people in life such as by doing difficult work in place of human beings. In other words, the ultimate purpose of producing robots for entertainment is to make these robots faithfully reproduce the actual mechanisms of, for example, human beings or monkeys, which walk on two feet while they are in an erect posture, and to make them move naturally and smoothly. Since entertainment robots are structured to emulate highly intelligent animals, such as human being or monkeys, which stand in an upright posture, it is desirable that they move in a way sufficiently indicative of emotions and feelings. In this sense, entertainment robots which emulate the movements of human beings are rightly called humanoid robots.

In short, it is no exaggeration to say that entertainment robots, though intently called a leg-movement-type robot, shares the elemental technologies of industrial robots, but are produced for a completely different ultimate purpose and uses completely different hardware mechanisms and operation controlling methods to achieve the ultimate purpose.

As is already well known in the related art, the human body has a few hundred joints, so that it has a few hundred degrees of freedom. In order to make the movements of leg-movement-type robots as close to those of human beings, it is preferable that the leg-movement-type robots be allowed to move virtually as freely as human beings. However, this is technologically very difficult to achieve. This is because, since one actuator needs to be disposed to provide one degree of freedom, a few hundred actuators needs to be disposed for a few hundred degrees of freedom, thereby increasing production costs and making it virtually impossible to design them in terms of, for example, their weight and size. In addition, when the number of degrees of freedom is large, the number of calculations required for, for example, positional/operational control or balance control is correspondingly increased exponentially.

Restating what has been stated in another way, humanoid robots must emulate the mechanisms of the human body equipped with a limited number of degrees of freedom. Entertainment robots are required to move naturally in a way close to that of human beings and in a way sufficiently indicative of emotions and feelings with considerable fewer degrees of freedom than the human body.

Leg-movement-type robots which walk on two feet while they are in an erect posture are excellent robots in that they can walk flexibly (such as up and down steps or over obstacles). However, since the center of gravity of such robots is located at a high position, it becomes correspondingly difficult to perform posture control and stable walking control. In particular, the walking and the posture of entertainment robots need to be controlled while they move naturally and in a way sufficiently indicative of emotions and feelings like intelligent animals, such as human beings or monkeys.

Various proposals regarding the stable walking of leg-movement-type robots have already been made. For example, Japanese Unexamined Patent Publication No. 5-305579 discloses a leg-movement-type robot which is made to walk stably by matching with a target value the zero moment point (ZMP), that is, the point on the floor surface where the moment resulting from the reaction force of the floor when the robot walks is zero.

Japanese Unexamined Patent Publication No. 5-305581 discloses a leg-movement-type robot constructed so that the ZMP is either situated in the inside of a supporting polyhedral (polygonal) member or at a location sufficiently separated by at least a predetermined amount from an end of the supporting polyhedral (polygonal) member when a foot of the robot lands on or separates from the floor. As a result, even when the robot is subjected to an external disturbance, it is not affected thereby in correspondence with a predetermined distance, making it possible make the robot walk more stably.

Japanese Unexamined Patent Publication No. 5-305583 discloses the controlling of the walking speed of a leg-movement-type robot by a ZMP target location. More specifically, in the leg-movement-type robot disclosed in this document, previously set walking pattern data is used to drive an arm joint so that the ZMP matches a target location, and the tilting of the upper part of the body is detected in order to change the ejection speed of the set walking pattern data set in accordance with the detected value. Thus, when the robot unexpectedly steps on an uneven surface and, for example, tilts forward, the original posture of the robot can be recovered by increasing the ejection speed. In addition, since the ZMP can be controlled so as to match the target location, there is no problem in changing the ejection speed in a device for supporting both arms.

Japanese Unexamined Patent Publication No. 5-305585 discloses the controlling of the landing position of a leg-movement-type robot by a ZMP target location. More specifically, the leg-movement-type robot disclosed in this document is made to walk stably by detecting any shifts between the ZMP target location and the actually measured position and driving one or both arms so as to cancel the shift, or by detecting the moment around the ZMP target location and driving an arm so that it becomes zero.

Japanese Unexamined Patent Publication No. 5-305586 discloses the controlling of the tilting of the posture of a leg-movement-type robot by a ZMP target location. More specifically, the leg-movement-type robot disclosed in this document is made to walk stably by detecting the moment around the ZMP target location and driving an arm so that, when the moment is produced, the moment is zero.

However, none of the above-described proposals mention anything about controlling the posture and walking of the robot while it is moving naturally and in a way sufficiently indicative of emotions and feelings like intelligent animals, such as human beings or monkeys.

A robot called WABIAN (Waseda Bipedal Humanoid) is disclosed in a treatise called The Development of Humanoid Robots Which Walk On Two Feet (Third Robotics Symposia, May 7 and 8, 1998) by Yamaguchi et al. WABIAN is a complete humanoid robot which is provided not only with the lower limbs, but also with the upper limbs and the trunk, so that it is provided with all parts of the body. WABIAN has been developed for the purpose of producing a robot whose whole body moves harmoniously while it is walking. FIGS. 13 and 14 are each schematic views of an assembled structure of WABIAN. WABIAN has been designed and manufactured to overcome the problems involved in working while moving the whole body harmoniously. By controlling the ZMP and the yaw axis moment on the ZMP as a result of trunk or trunk/waist harmonious movement three axial moment compensation operations, the robot may be made to walk while its lower limbs, finger tips, and trunk take any path of movement. The mechanical models illustrated in the figures use extra super Duralumin as main structural material, and has a total weight of 107 kg and an overall length of 1.66 m when they are standing still in an erect posture.

SUMMARY OF THE INVENTION

Accordingly, it is an object of the present invention to provide an excellent robot having a structure which emulates the mechanisms and movements of the human body.

It is another object of the present invention to provide an excellent leg-movement-type robot which walks on two feet and which includes the upper half of the body, such as the trunk, the head, the arms, etc., formed on top of the legs.

It is still another object of the present invention to provide an excellent robot which can move naturally in a way close to that of a human being and sufficiently indicative of emotion and feelings with a considerable fewer degrees of freedom than a human being.

It is still another object of the present invention to provide an excellent robot in which the posture and the walking thereof can be controlled while the robot moves naturally and in a way sufficiently indicative of emotions and feelings like intelligent beings such as human beings or monkeys.

To these ends, according to a first aspect of the present invention, there is provided a leg-movement-type robot which moves using lower limbs. The robot comprises at least the lower limbs and a trunk. In the robot, a hip joint which connects the lower limbs and the trunk possesses at least a degree of freedom in correspondence with a hip joint yaw axis which is included in the hip joint. The robot further comprises an offset setting mechanism for arbitrarily offsetting the hip joint yaw axis from the hip joint in a roll axis direction.

According to a second aspect of the present invention, there is provided a leg-movement-type robot which moves using lower limbs. The robot comprises at least the lower limbs and a trunk. In the robot, a hip joint which connects the lower limbs and the trunk possesses at least a degree of freedom in correspondence with a hip joint yaw axis which is included in the hip joint. The hip joint yaw axis is offset from the hip joint in a roll axis direction.

According to a third aspect of the present invention, there is provided a leg-movement-type robot which moves using lower limbs. The robot comprises at least the lower limbs and a trunk. In the robot, a hip joint yaw axis used for changing the direction of a foot tip is offset from the location of a hip joint used for walking using the feet.

In the robots of the first to third aspects of the present invention, the amount of offset of the hip joint yaw axis from the location of the hip joint can be adjusted, so that it is possible to accommodate to the effects of the movement of the center of gravity produced in accordance with the mode of use of the robot in order to flexibly balance the weights of the upper and lower limbs. Therefore, it is possible to make the robot walk smoothly and naturally while it is in an erect posture.

By offsetting the hip joint axis, the size of the portion of the robot corresponding to the waist can be made smaller and compact, so that it is possible to form a robot whose mechanical units are dimensionally proportioned with respect to each other. In other words, it is possible to form a robot which has a proportioned external appearance close to that the natural form of the body of an animal (which walks while it is in an erect posture), such as a human being or a monkey.

When the joint yaw axis is offset from the location of the hip joint in the backward direction or in the direction opposite to the direction of movement, the location of the center of gravity of the entire robot is situated forwardly of the hip joint yaw axis. Therefore, in order to ensure stability in the pitch direction, the hip joint yaw axis is disposed behind the location of the center of each of the left and right feet. In this case, even if the hip joint yaw axis is rotated to change the direction of a foot, interference between the left and right feet can be reduced. In other words, since the width of the crutch does not need to be increased, the posture of the robot can be easily controlled in order to allow it to walk stably on two feet.

According to a fourth aspect of the present invention, there is provided a leg-movement-type robot which moves using lower limbs. The robot comprises at least the lower limbs and a trunk. In the robot, a hip joint which connects the lower limbs and the trunk possesses at least a degree of freedom in correspondence with a hip joint yaw axis which is included in the hip joint. The robot further comprises an offset setting mechanism for arbitrarily offsetting the hip joint yaw axis from the trunk in a roll axis direction.

According to a fifth aspect of the present invention, there is provided a leg-movement-type robot which moves using lower limbs. The robot comprises at least the lower limbs and a trunk. In the robot, a hip joint which connects the lower limbs and the trunk possesses at least a degree of freedom in correspondence with a hip joint yaw axis which is included in the hip joint. The hip joint yaw axis is offset from the trunk in a roll axis direction.

According to a sixth aspect of the present invention, there is provided a leg-movement-type robot which moves using lower limbs. The robot comprises at least the lower limbs and a trunk. In the robot, a hip joint yaw axis used for changing the direction of a foot tip is offset from the trunk.

According to the robots of the fourth to sixth aspects of the present invention, the amount of offset of the hip joint yaw axis from the trunk can be adjusted, so that it is possible to accommodate to the effects of the movement of the center of gravity in order to flexibly balance the weights of the upper and lower limbs. Therefore, it is possible to make the robot walk smoothly and naturally while it is in an erect posture.

The basic movement of, for example, a human being which walks on two feet is based on a forwardly tilted posture. Therefore, the robot can easily exhibit the natural movement of a human being when the trunk which corresponds to the waist of a human being is disposed towards the front. According to the robots in accordance with the fourth to the six aspects, the walking of a human being can be faithfully emulated by offsetting the hip joint yaw axis from the trunk in the roll axis direction.

By performing an offsetting operation and moving the center of gravity of the entire robot slightly forward, the robot can easily balance itself in terms of its weight while it is walking.

According to a seventh aspect of the present invention, there is provided a leg-movement-type robot which moves using lower limbs. The robot comprises at least the lower limbs and a trunk. In the robot, the trunk is offset from the lower limbs in a roll axis direction.

According to an eighth aspect of the present invention, there is provided a leg-movement-type robot which moves using lower limbs. The robot comprises upper limbs, the lower limbs, and a trunk. In the robot, the upper limbs are offset from the lower limbs in a roll axis direction.

According to a ninth aspect of the present invention, there is provided a robot of a type which spreads the legs thereof based on rotational degrees of freedom provided in correspondence with a hip joint roll axis, a hip joint pitch axis, and a hip joint yaw axis. In the robot, at least the lower limbs and a trunk are mounted substantially vertically along a body axis direction, and the hip joint yaw axis is offset from the body axis by a predetermined amount.

According to a tenth aspect of the present invention, there is provided a robot of a type which spreads the legs thereof based on rotational degrees of freedom provided in correspondence with a hip joint roll axis, a hip joint pitch axis, and a hip joint yaw axis. In the robot, at least lower limbs and a trunk are mounted substantially vertically along a body axis direction, and the hip joint yaw axis is offset from the body axis by a predetermined amount in a negative roll axis direction.

According to an eleventh aspect of the present invention, there is provided a joint device for a robot comprising a plurality of joints. In the joint device, at least rotational degrees of freedom in correspondence with a roll axis, a pitch axis, and a yaw axis are provided, and the yaw axis is offset in a roll axis direction from an axis perpendicular to the roll axis and the pitch axis.

According to a twelfth aspect of the present invention, there is provided a joint device for a robot comprising a plurality of joints. In the joint device, at least rotational degrees of freedom provided in correspondence with a roll axis, a pitch axis, and a yaw axis are provided, and the yaw axis is situated at a twisting location with respect to both the roll axis and the pitch axis.

Other objects, feature, and advantages of the present invention will be made clear from the detailed description given in conjunction with the embodiment described below and the attached drawings.

DESCRIPTION OF THE PREFERRED EMBODIMENT

Before disclosing a preferred embodiment of the present invention, the coordinate system used to express, for example, the degrees of freedom of a robot in the specification will be defined.

In the embodiment, the direction of movement of the robot is used to define the x axis. The horizontal direction towards the left or right is used to define the y axis (with the horizontal direction towards the right being defined as the positive direction). The vertical direction is used to define the z axis. In the industry, in general, the xz plane is called the sagittal plane, whereas the yx plane in which the robot faces the front is called the front plane.

Figure 12:
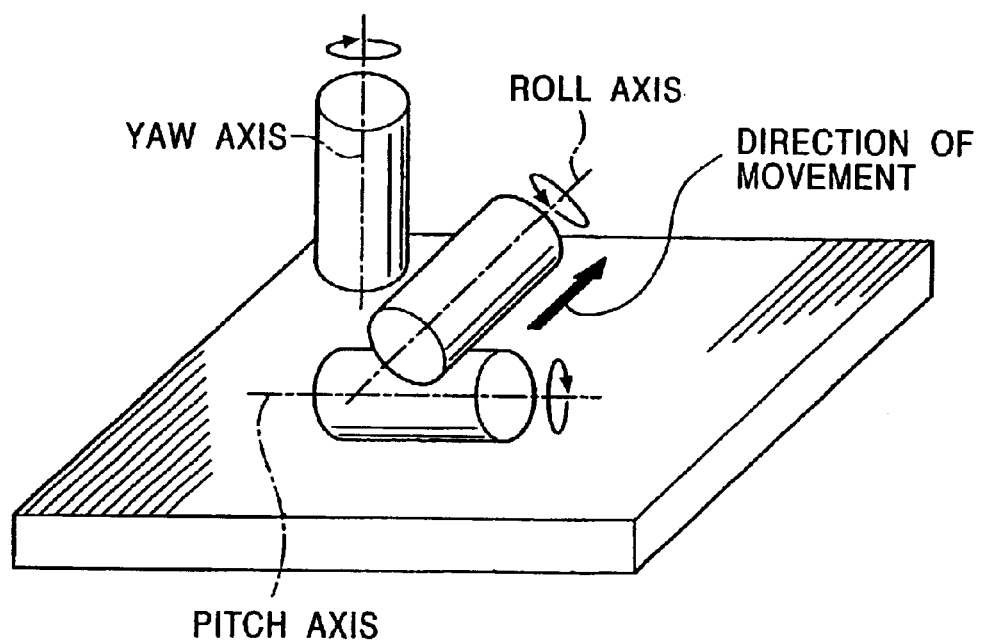
FIG. 12 illustrates a coordinate system showing the direction of movement of the humanoid robot 100.
Figure 13:
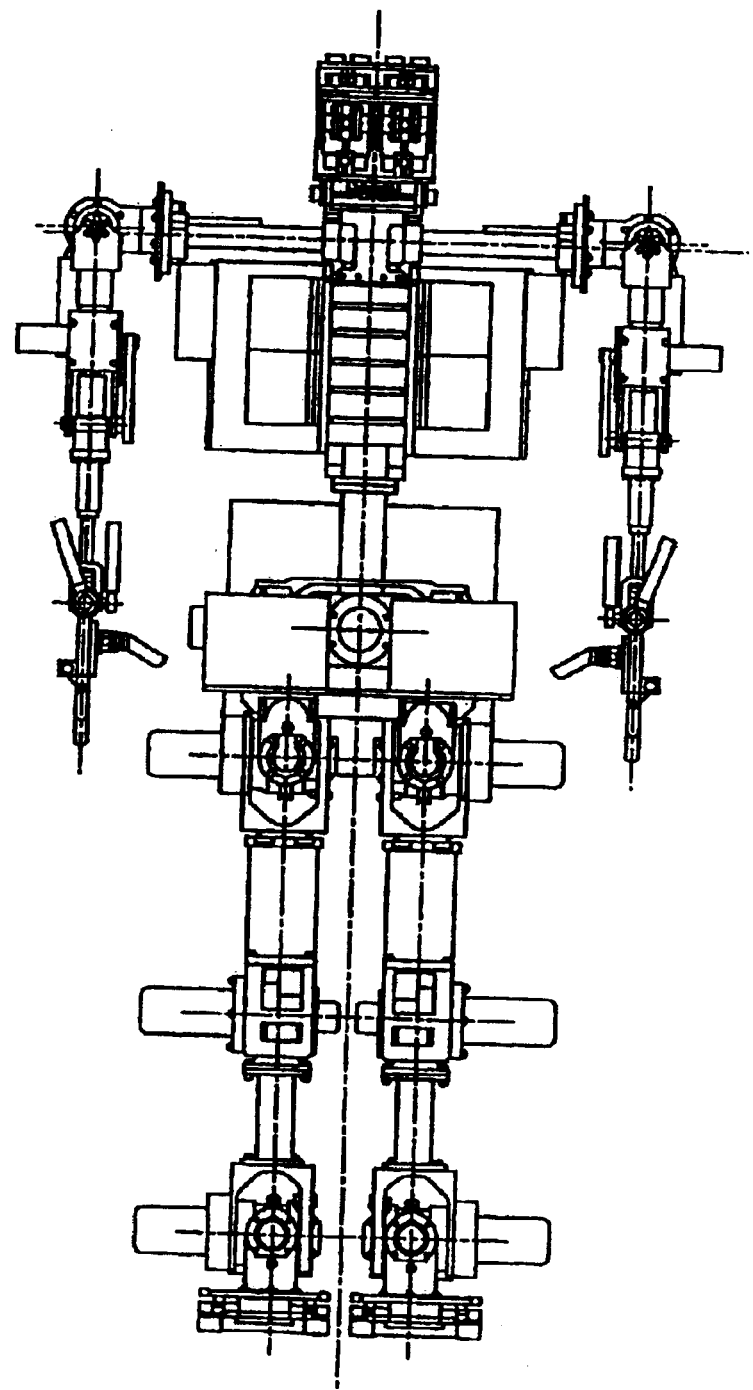
FIG. 13 schematically illustrates the structure of a humanoid robot WABIAN which walks on two feet when viewed from the front plane.
Figure 14:
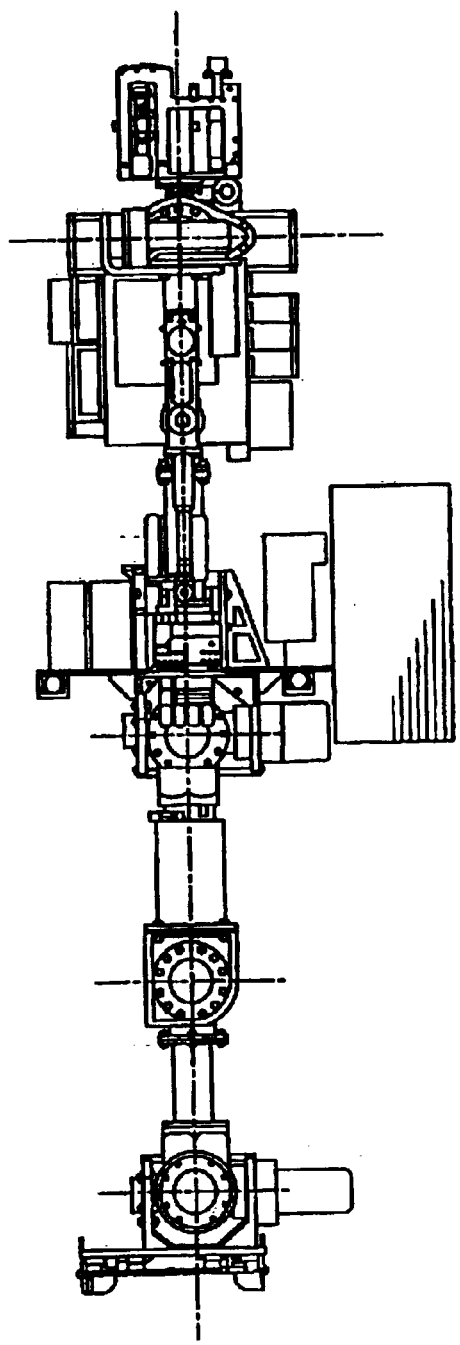
FIG. 14 schematically illustrates the structure of the humanoid robot WABIAN which walks on two feet when viewed in the sagittal plane.

As shown in FIG. 12, rotation around the direction of movement (that is, around the x axis) is called roll, rotation around the horizontal direction towards the left or right (that is, around the y axis) is called pitch, and the rotation around the vertical direction (that is, around the z axis direction) is called yaw.

A description of the embodiment will now be given in detail with reference to the drawings.

Figure 1:
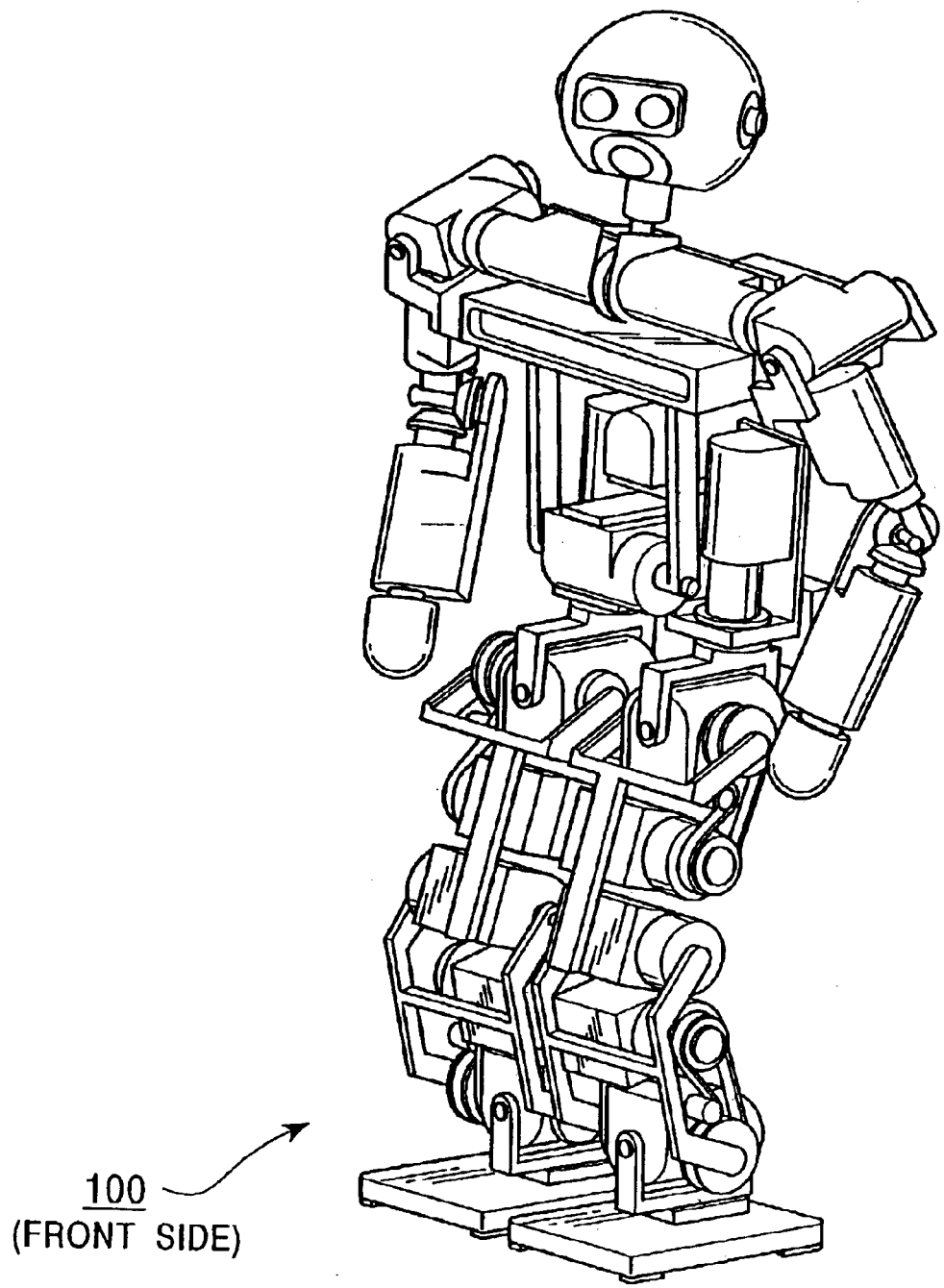
FIG. 1 is a front view of a humanoid robot 100 of an embodiment of the present invention.
Figure 2:
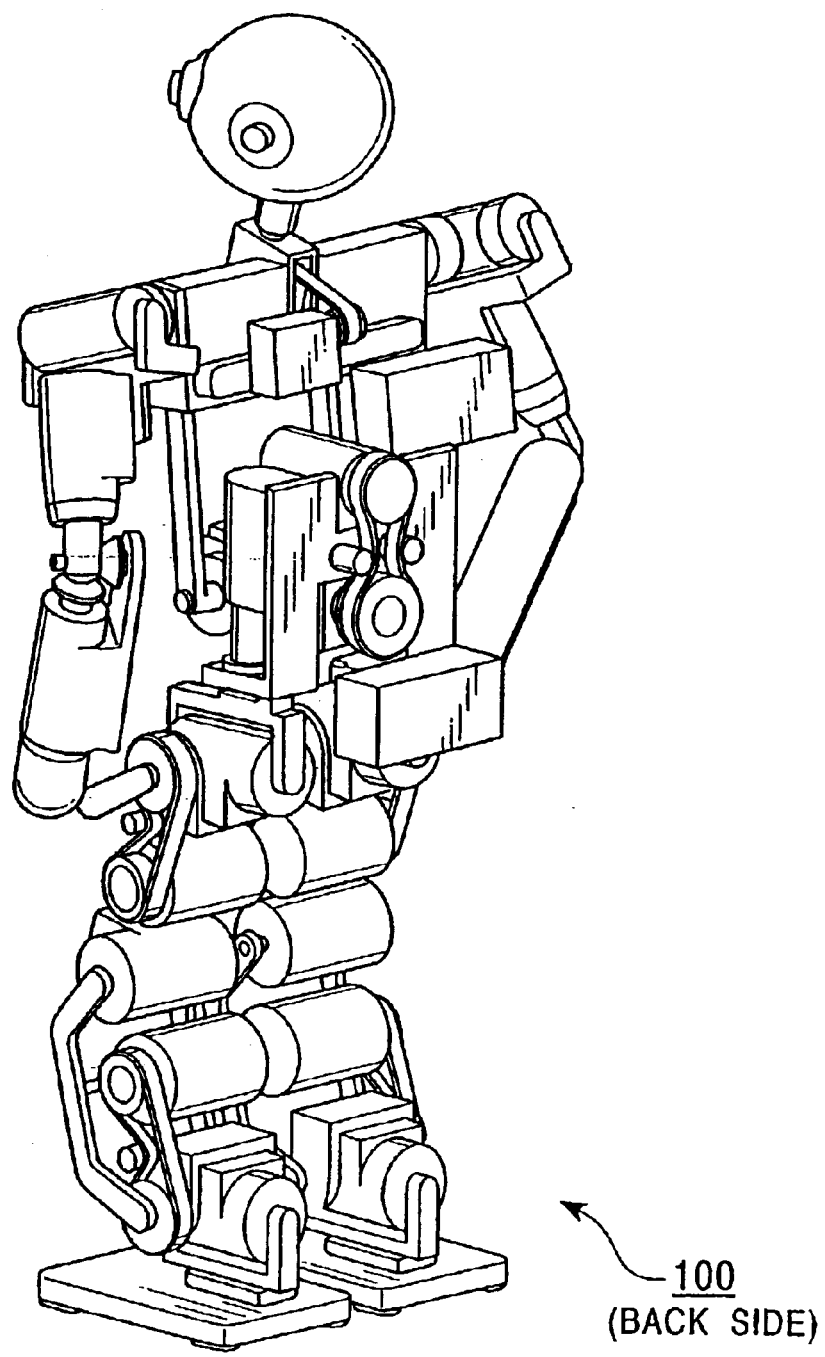
FIG. 2 is a back view of the humanoid robot 100 of the embodiment of the present invention.
Figure 3:
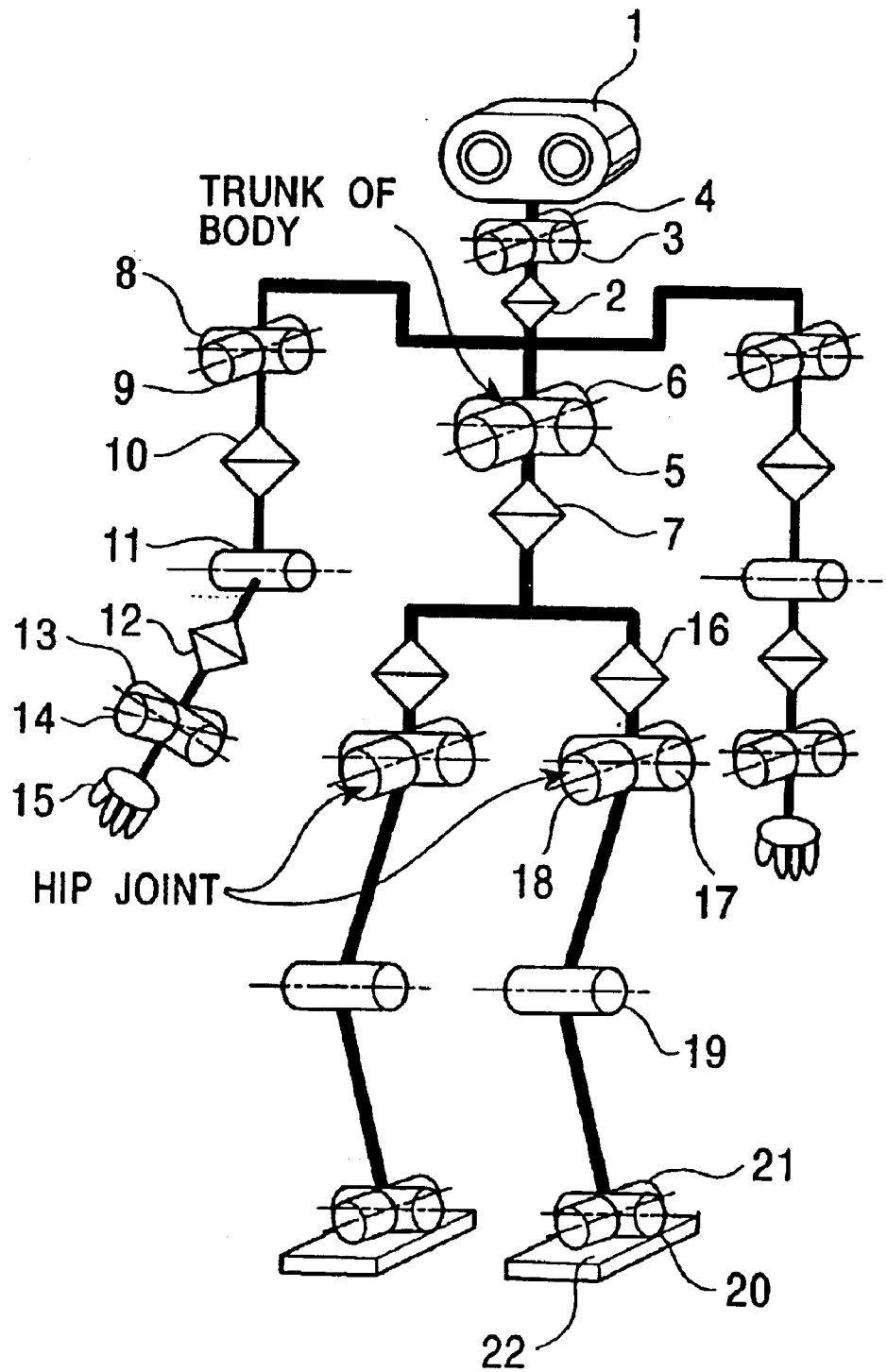
FIG. 3 is a schematic view of a structural model showing the degrees of freedom of the humanoid robot 100 of the embodiment of the present invention.

FIGS. 1 and 2 are a front view and a back view of a humanoid robot 100 of the embodiment of the present invention. FIG. 3 is a schematic view of a structural model showing the degrees of freedom of the humanoid robot 100 of the embodiment of the present invention.

As shown in FIG. 3, the humanoid robot 100 comprises upper limbs including two arms, a head 1, lower limbs including two legs for moving the humanoid robot 100, and a trunk which connects the upper limbs and the lower limbs.

The neck joint which supports the head 1 has three degrees of freedom produced in correspondence with a neck joint yaw axis 2, a neck joint pitch axis 3, and a neck joint roll axis 4.

The arms each comprise a shoulder joint pitch axis 8, a shoulder joint roll axis 9, an upper arm yaw axis 10, an elbow joint pitch axis 11, a front arm yaw axis 12, a wrist joint pitch axis 13, a wrist joint roll axis 14, and a hand 15. Actually, each hand 15 has a structure which includes many joints/degrees of freedom and a plurality of fingers. However, since the movements of the hands 15 only slightly contribute to and affect the controlling of the posture and the walking of the robot 100, it is assumed that each hand 15 has zero degrees of freedom. Therefore, each arm is defined as having seven degrees of freedom.

The trunk has three degrees of freedom produced in correspondence with a trunk pitch axis 5, a trunk roll axis 6, and a trunk yaw axis 7. In the specification, the point where the trunk pitch axis 5 and the trunk roll axis 6 intersect is defined as the location of the trunk.

The legs or the lower limbs each includes a hip joint yaw axis 16, a hip joint pitch axis 17, a hip joint roll axis 18, a knee joint pitch axis 19, an ankle joint pitch axis 20, an ankle joint roll axis 21, and a foot 22. In the specification, the point where each hip joint pitch axis 17 and its corresponding hip joint roll axis 18 intersect is defined as the position of each hip joint. Actually, each foot 22 of the human body has a structure which includes a sole with many joints and degrees of freedom. However, each sole of the humanoid robot 100 of the embodiment has zero degrees of freedom. Therefore, each leg is constructed so as to have six degrees of freedom.

To sum up, the total number of degrees of freedom of the humanoid robot 100 of the embodiment is 3+7×2+3+6×2= 32. However, the number of degrees of freedom of the entertainment humanoid robot 100 is not necessarily limited to 32. It is obvious that the number of degrees of freedom, that is, the number of joints can be increased or decreased as necessary in accordance with, for example, the limiting conditions in designing and manufacturing the robot and the required specification.

Each degree of freedom of the above-described humanoid robot 100 is actually provided using an actuator. To respond to the demands of approximating the form of the robot to the natural form of a human being by removing extra bulges from its external appearance, and of controlling the posture of an unstable structure for walking on two feet, it is preferable to use small and light actuators. In the embodiment, there are used in the humanoid robot 100 small AC (alternating current) servo actuators which are directly connected to gears and incorporate in a motor unit a servo control system formed into a one-chip system. This type of AC servo actuator is disclosed in, for example, Japanese Application No. 11-33386 which has already been assigned to the applicant.

Figure 4:
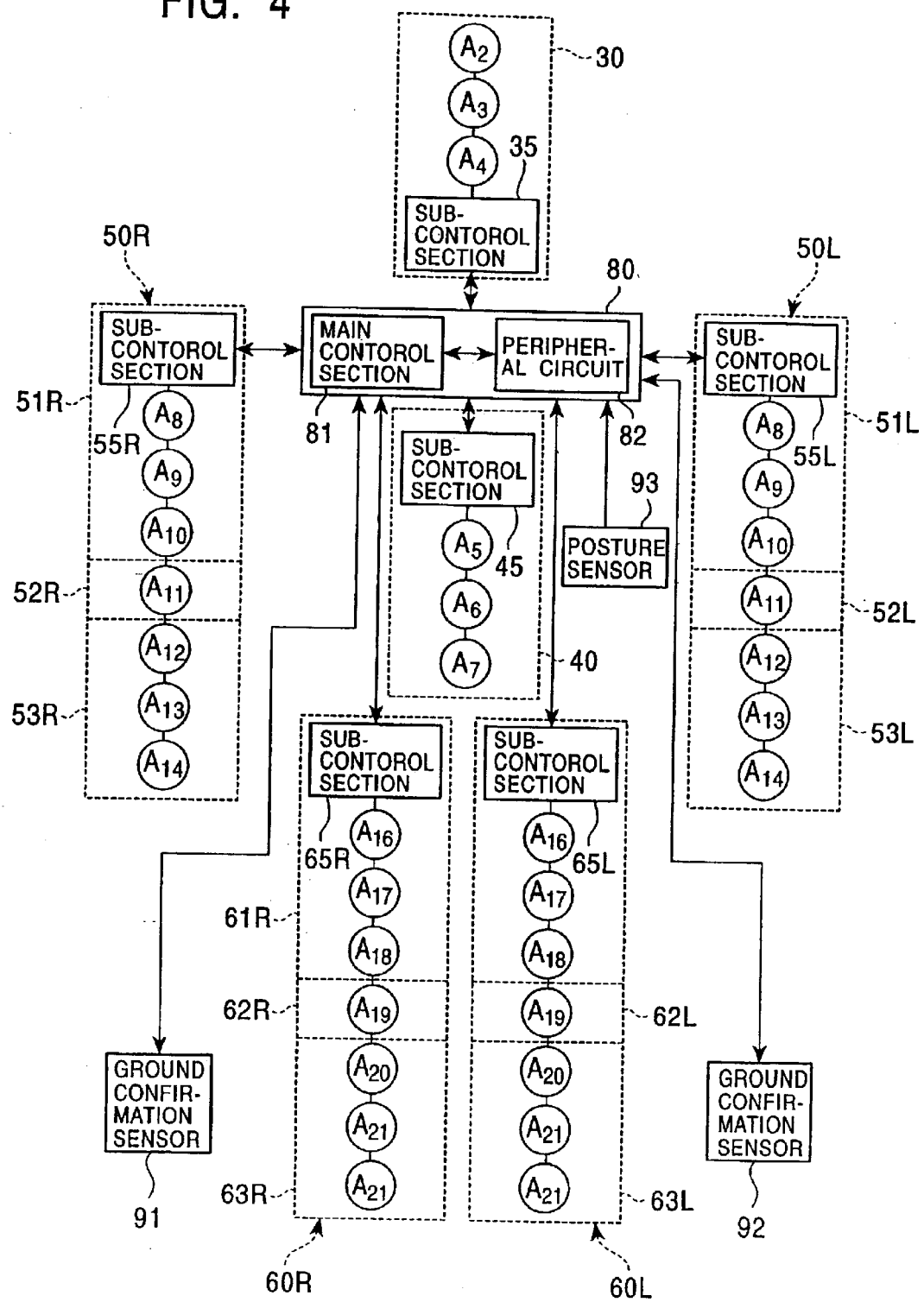
FIG. 4 is a schematic view of the structure of a control system of the humanoid robot 100 of the embodiment of the present invention.

FIG. 4 is a schematic view of the structure of a control system of the humanoid robot 100. As shown in FIG. 4, the humanoid robot 100 comprises mechanical units 30, 40, 50R, 50L, 60R, and 60L, which are formed in correspondence with the head, the trunk, and the four limbs of a human being. The humanoid robot 100 also comprises a control unit 80 for performing a suitable controlling operation in order to achieve harmonious movements between each of the mechanical units 30, 40, 50R, 50L, 60R, and 60L. (The R and L in 50R and 50L and in 60R and 60L stand for right and left, respectively. This also applies to the R and L appearing in the reference numerals below.)

The movement of the entire humanoid robot 100 is generally controlled by the control unit 80. The control unit 80 comprises a main control section 81 and a peripheral circuit 82. The main control section 81 comprises main circuit components (not shown), such as a central processing unit (CPU) and a memory. The peripheral circuit 82 includes an interface (not shown) for allowing transfer of data and commands between, for example, a power supply circuit and each of the structural elements of the robot 100.

For realizing the present invention, the location of placement of the control unit 80 is not particularly limited. Although, in FIG. 4, the control unit 80 is installed at the trunk unit 40, it may be installed at the head unit 30 or outside the humanoid robot 100. When it is installed outside the humanoid robot 100, communication with the body of the humanoid robot 100 may be carried out through wire or by radio.

Each degree of freedom of the humanoid robot shown in FIG. 3 is provided using a corresponding joint actuator. More specifically, the head unit 30 includes a neck joint yaw axis actuator $A_2$, a neck joint pitch axis actuator $A_3$, and a neck joint roll axis actuator $A_4$ disposed in correspondence with the neck joint yaw axis 2, the neck joint pitch axis 3, and the neck joint roll axis 4, respectively.

The trunk unit 40 comprises a trunk pitch axis actuator $A_5$, a trunk roll axis actuator $A_6$, and a trunk yaw axis actuator $A_7$ disposed in correspondence with the trunk pitch axis 5, the trunk roll axis 6, and the trunk yaw axis 7, respectively.

The arm unit 50R is divided into an upper arm unit 51R, an elbow joint unit 52R, and a front arm unit 53R. The arm unit 50L is divided into an upper arm unit 51L, an elbow joint unit 52L, and a front arm unit 53L. Each of the arm units 50R and 50L comprises a shoulder joint pitch axis actuator $A_8$, a shoulder joint roll axis actuator $A_9$, an upper arm yaw axis actuator $A_{10}$, an elbow joint pitch axis actuator $A_{11}$, an elbow joint roll axis actuator $A_{12}$, a wrist joint pitch axis actuator $A_{13}$, and a wrist joint roll axis actuator $A_{14}$ disposed in correspondence with its respective shoulder joint pitch axis 8, its respective shoulder joint roll axis 9, its respective upper arm yaw axis 10, its respective elbow joint pitch axis 11, its respective elbow joint roll axis 12, its respective wrist joint pitch axis 13, and its respective wrist joint roll axis 14.

The leg unit 60R is divided into a thigh unit 61R, a knee unit 62R, and a shin unit 63R. The leg unit 60L is divided into a thigh unit 61L, a knee unit 62L, and a shin unit 63L. Each of the leg units 60R and 60L includes a hip joint yaw axis actuator $A_{16}$, a hip joint pitch axis actuator $A_{17}$, a hip joint roll axis actuator $A_{18}$, a knee joint pitch axis actuator $A_{19}$, an ankle joint pitch axis actuator $A_{20}$, and an ankle joint roll axis actuator $A_{21}$ disposed in correspondence with its respective hip joint yaw axis 16, its respective hip joint pitch axis 17, its respective hip joint roll axis 18, its respective knee joint pitch axis 19, its respective ankle joint pitch axis 20, and its respective ankle joint roll axis 21.

Preferably, each of the actuators $A_2$ to $A_{21}$ is a small AC servo actuator (described above) which is directly connected to gears and which incorporates in a motor unit a servo control system formed into a one-chip system.

Subcontrol sections 35, 45, 55L and 55R, and 65L and R for controlling the driving of the corresponding actuators are disposed for the head unit 30, the trunk unit 40, the arm units 50L and 50R, and the leg units 60L and 6R, respectively. Ground confirmation sensors 91 and 92 for detecting whether or not the soles of the legs 60R and 60L have landed on the floor are installed. A posture sensor 93 for measuring the posture is installed in the trunk unit 40.

The main control section 81 suitably controls the subcontrol sections 35, 45, 55L and 55R, and 65L and 65R in response to outputs from the sensors 91 to 93 in order to cause the upper limbs, the trunk, and the lower limbs of the humanoid robot 100 to move harmoniously. In accordance with, for example, user commands, the main control section 81 sets the movements of the legs, the zero moment point (ZMP) path, the movement of the trunk, the movements of the upper limbs, the posture and height of the waist, etc. Then, it sends commands for moving the above-described parts of the body in accordance with the aforementioned setting to each of the subcontrol sections 35, 45, 55L and 55R, and 65L and 65R. After the commands have been sent, each of the subcontrol sections 35, 45, 55L and 55R, and 65L and 65R interprets its corresponding command received from the main control section 81 in order to output a corresponding drive control signal to each of the joint actuators $A_2$ to $A_{21}$.

Figure 5:
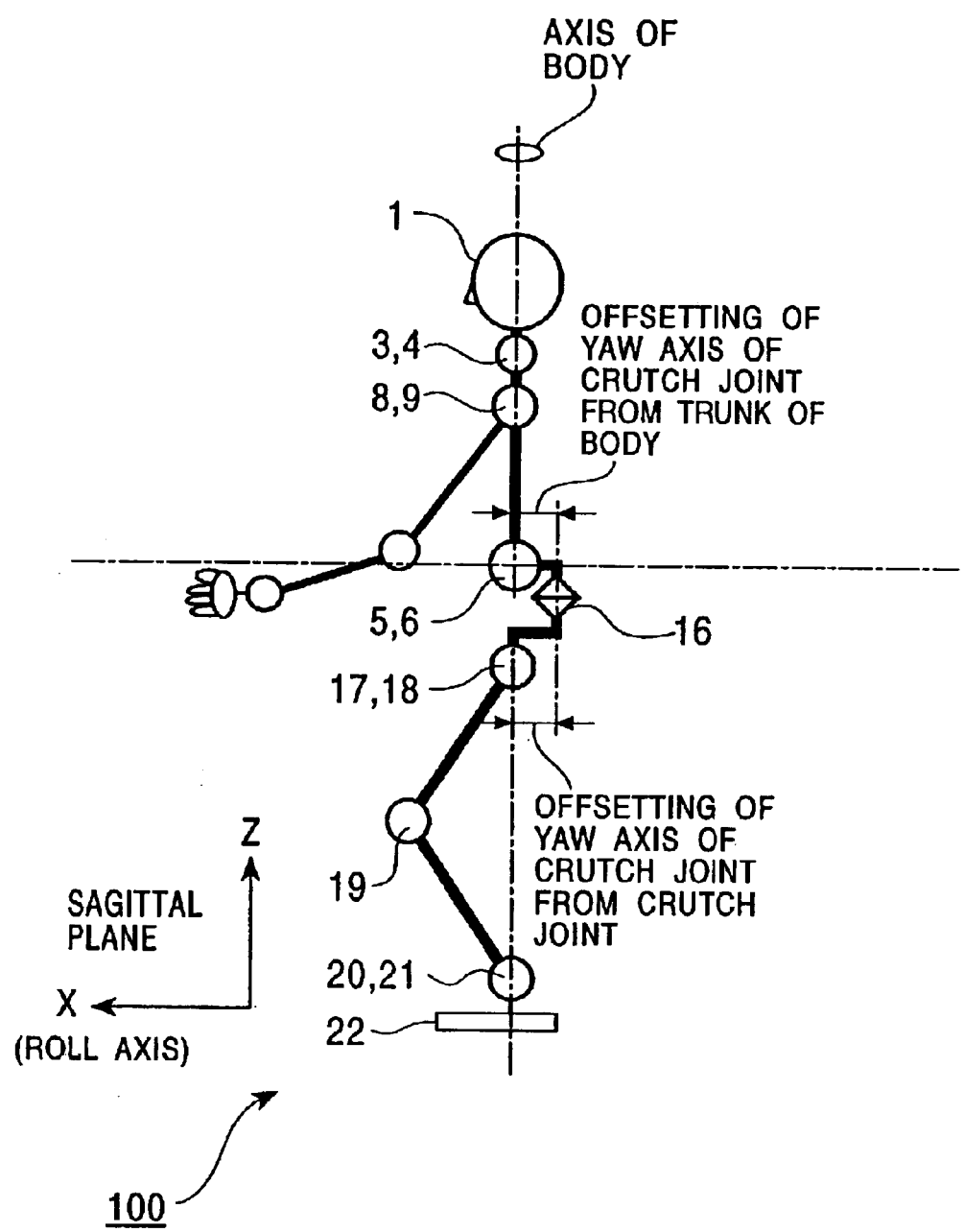
FIG. 5 illustrates a structural model showing the degrees of freedom of the humanoid robot 100 of the embodiment of the present invention in the sagittal plane.

FIG. 5 illustrates a structural model showing the degrees of freedom of the humanoid robot 100 of the embodiment of the present invention when viewed from the sagittal plane. In order not to complicate FIG. 5, some of the joints shown in FIG. 3 have been omitted. In FIG. 5, the alternate long and short dashed line which extends in a vertical direction in the plane of the sheet is defined as the trunk axis, that is, the vertical axis which passes through substantially the center of gravity of the humanoid robot 100.

A first feature of the humanoid robot 100 of the embodiment is a mechanism which makes it possible to arbitrarily set the offset locations of the hip joint yaw axes 16 from the corresponding hip joints, that is, the offset location of the trunk from the lower limbs in the roll axis direction.

Here, the locations of the hip joints are defined as the points where the corresponding hip joint pitch axes 17 and the corresponding hip joint roll axes 18 intersect each other (as described above). As can be seen from FIG. 5, the amount of offset of each hip joint yaw axis 16 in the roll axis direction defines the location where each lower limb is mounted with respect to its corresponding upper limb. When the hip joint yaw axis 16 mounting locations are not offset, in the sagittal plane the lines passing through the hip joint locations and the corresponding hip joint yaw axes 16 are lined up in the vertical direction, that is, in a straight line in the yaw axis direction of the entire robot 100. In contrast to this, in FIG. 5, the hip joint yaw axes 16 are offset, so that they are separated upward in the vertical direction from their corresponding hip joint locations by the corresponding offset amounts.

The humanoid robot 100 which is used to help people in life or which is constructed so as to be closely connected to life is used in an infinite variety of ways. For example, the humanoid robot 100 may be used to carry baggage with one or both arms, or to hold a heavy object in both arms, or to carry a bag on the shoulder. In these cases, the location of the center of gravity changes considerably. Since the offset amount of each hip joint yaw axis 16 from its corresponding hip joint location can be adjusted, it is possible to accommodate to the effect of changes in the location of the center of gravity, so the weights of the upper and lower limbs can be flexibly balanced.

When each hip joint yaw axis 16 is offset from its corresponding hip joint location in the roll axis direction, the hip joints can be made more compact in size.

Although the actuators $A_2$ to $A_{21}$ which produce their corresponding degrees of freedom of the humanoid robot 100 are AC servo actuators (described above) which are directly connected to gears so that they are smaller than other types of servo actuators, the actual dimensions of these actuators are in the direction of the axis of rotation or the radial direction of the actuators. Regarding the hip joint yaw axes 16, the yaw axis actuators $A_{16}$ increase the dimensions of the hip joints in the height directions.

If a hip joint yaw axis 16 is disposed so as to intersect at right angles to its corresponding hip joint location, the size of the hip of the humanoid robot 100 is equal to the sum of the diameters (assumed to be 2D) of the actuators $A_{17}$ and $A_{18}$ (formed in correspondence with the respective hip joint pitch axis 17 and the respective hip joint roll axis 18 ) and the longitudinal dimension (assumed to be L) of the hip joint yaw axis actuator $A_{16}$. Therefore, the size of the hip of the humanoid robot 100 is equal to 2D+L. Consequently, the dimensions of the mechanical units are no longer in proportion or balanced with respect to each other. On the other hand, when each of the hip joint yaw axis 16 is offset, the height of the portion of the humanoid robot 100 corresponding to the waist can be made smaller than 2D+L, making it possible to form the humanoid robot 100 whose mechanical units are dimensionally proportioned with respect to each other. In other words, it is possible to form the humanoid robot 100 which has a proportioned appearance very close to the nature form of the human body. This point will be discussed later will reference to FIG. 8.

When the hip joint yaw axes 16 are offset in the roll axis direction from their corresponding hip joint locations, it is also possible to prevent interference between the left and right feet (when, in particular, the feet are rotated to change direction) when the robot 100 is walking. This point will hereunder be described with reference to FIGS. 6 and 7. In general, a robot which walks on two feet changes direction by rotating a foot or an ankle in a desired direction of change in order to advance the ankle in the desired direction of change.

Figure 6:
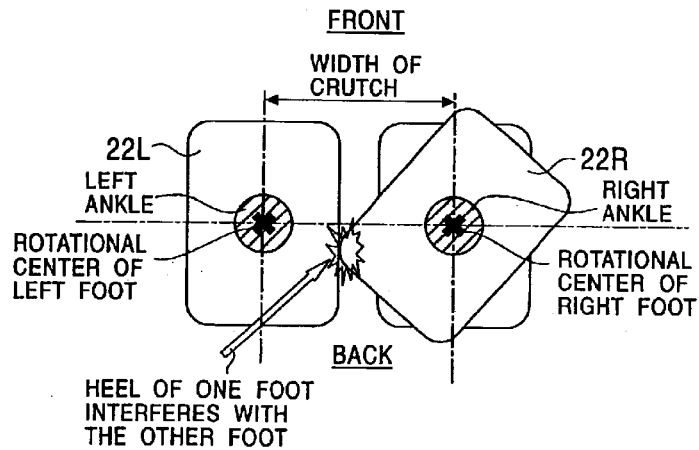
FIG. 6 is a schematic view showing the relationship between the positions of left and right feet 22L and 22R and the positions of hip joint yaw axes 16 when the hip joint yaw axes 16 are not offset from corresponding hip joint positions in the roll direction.
Figure 7:
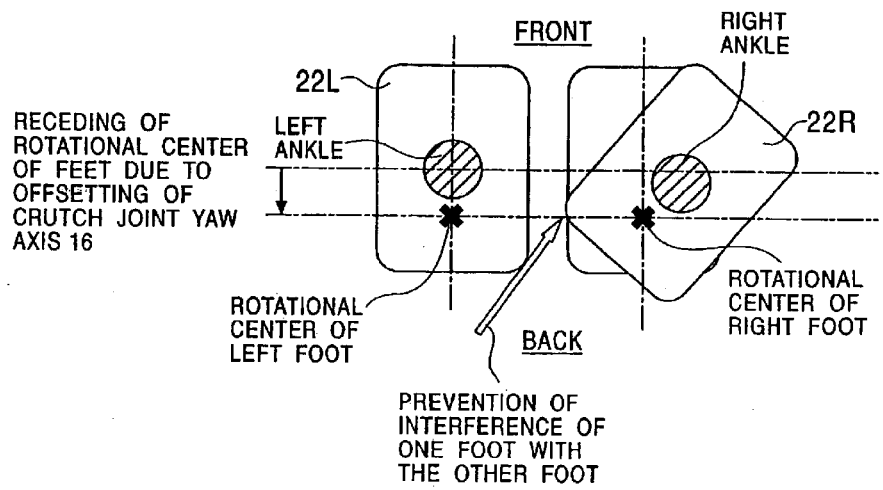
FIG. 7 is a schematic view showing the relationship between the positions of the left and right feet 22L and 22R and the positions of the hip joint yaw axes 16 when the hip joint yaw axes 16 are not offset from their corresponding hip joint positions in the roll direction.

When the hip joint yaw axes 16 are not offset from their corresponding hip joint locations, that is, when the hip joint locations and the corresponding hip joint yaw axes 16 are lined up vertically or in a straight line in the yaw axis direction, the load is concentrated at a particular location, so that the location of the center of gravity of the whole humanoid robot 100 is confined near the hip joint yaw axes 16. Therefore, as shown in FIG. 6, in order to ensure that the robot 100 walk stably, that is, in order to achieve stability in the pitch direction, the left and right ankles must be mounted so that they are substantially aligned with the centers of feet 22R and 22L.

By rotating the foot in the desired direction of change and advancing the foot forward, the robot of the type walking on two feet can change direction. Specifically, this foot is rotated around its corresponding hip joint yaw axis 16. When this hip joint yaw axis 16 is not offset from its corresponding hip joint location, the center of rotation of the foot is substantially aligned with the center of the ankle. In the base where, as shown in FIG. 6, the ankles are substantially aligned with the centers of the corresponding feet, when one of the feet is rotated, its heel interferes with the other foot, making it impossible to change direction at predetermined extreme angles.

It is possible to prevent interference (illustrated in FIG. 6 ) between the left and right feet by increasing the width of the hip, that is, the distance between the right leg unit 60R and the left leg unit 60L However, when the bipedal robot has a wider hip, the center of gravity moves considerably horizontally towards the left and right while it is moving or walking, though its posture becomes more stable when it is not walking. Therefore, it becomes considerably difficult to control the posture of the robot as a result of the action of the inertial moment.

In contrast, when, as shown in FIG. 5, the hip joint yaw axes 16 are offset from their corresponding hip joint locations in the backward direction or in the direction opposite to the direction of movement, the load spreads, so that the center of gravity of the entire humanoid robot 100 is located forwardly from the hip joint yaw axes 16. Since the hip joint yaw axes 16 are offset from their corresponding hip joint locations, the centers of rotation of the left and right feet are disposed behind their corresponding ankles.

In this case, even if one of the hip joint yaw axis 16 is rotated for changing direction, it is possible to reduce interference between the feet 22R and 22L. In other words, since it is not necessary to increase the width of the crutch, posture control can be easily carried out to cause the robot to walk stably on two feet.

A second feature of the humanoid robot 100 of the embodiment is another mechanism which makes it possible to arbitrarily set the offset locations of the hip joint yaw axes 16 from the upper part of the body, that is, from the trunk in the roll axis direction.

The location of the trunk in the embodiment is defined as the point where the trunk pitch axis 5 and the trunk roll axis 6 intersect. (However, judging from the gist of the present invention, the location of the trunk should not be defined in a restrictive sense. It should be defined by comparison with the mechanisms of, for example, human beings and monkeys.) As can be understood from FIG. 5, the offset amount of each of the hip joint yaw axis 16 in the roll axis direction defines the location of mounting of the upper part of the body onto the lower limbs. When the hip joint yaw axis 16 mounting locations are not offset, in the sagittal plane the location of the trunk and the hip joint yaw axes 16 are lined up vertically, that is, in a straight line in the yaw axis direction of the entire robot 100. In contrast, the hip joint yaw axes 16 are, as shown in FIG. 5, offset downward in the vertical direction from the location of the trunk by the offset amounts.

As already mentioned, the humanoid robot 100 which is used to help people in life and which is produced so as to be closely connected to human life is used in an infinite variety of ways. In addition, the location of the center of gravity of the humanoid robot 100 changes considerably in accordance with its mode of use. Since the offset amounts of the hip joint yaw axes 16 from the location of the trunk can be adjusted, it is possible to accommodate to the effect of the movement of the center of gravity in order to flexibly balance the weights of the upper and lower limbs. As a result, it is possible to easily make the robot 100 which has a structure whose center of gravity is situated at a relatively high location walk stably while it is in an erect posture.

The basic movement of a human being walking on two feet is based on a forwardly tilted posture. In other words, it is easier to make a robot exhibit the natural movement of a human being when the trunk which corresponds to the waist of a human being is disposed towards the front. The humanoid robot 100 of the embodiment can faithfully emulate the walking of a human being by offsetting the hip joint yaw axes 16 from the location of the trunk in the roll axis direction.

By offsetting the hip joint yaw axes 16 and moving the location of the center of gravity of the entire robot 100 slightly forward, the robot 100 can easily balance itself in terms of its weight while it is walking or moving.

Figure 8:
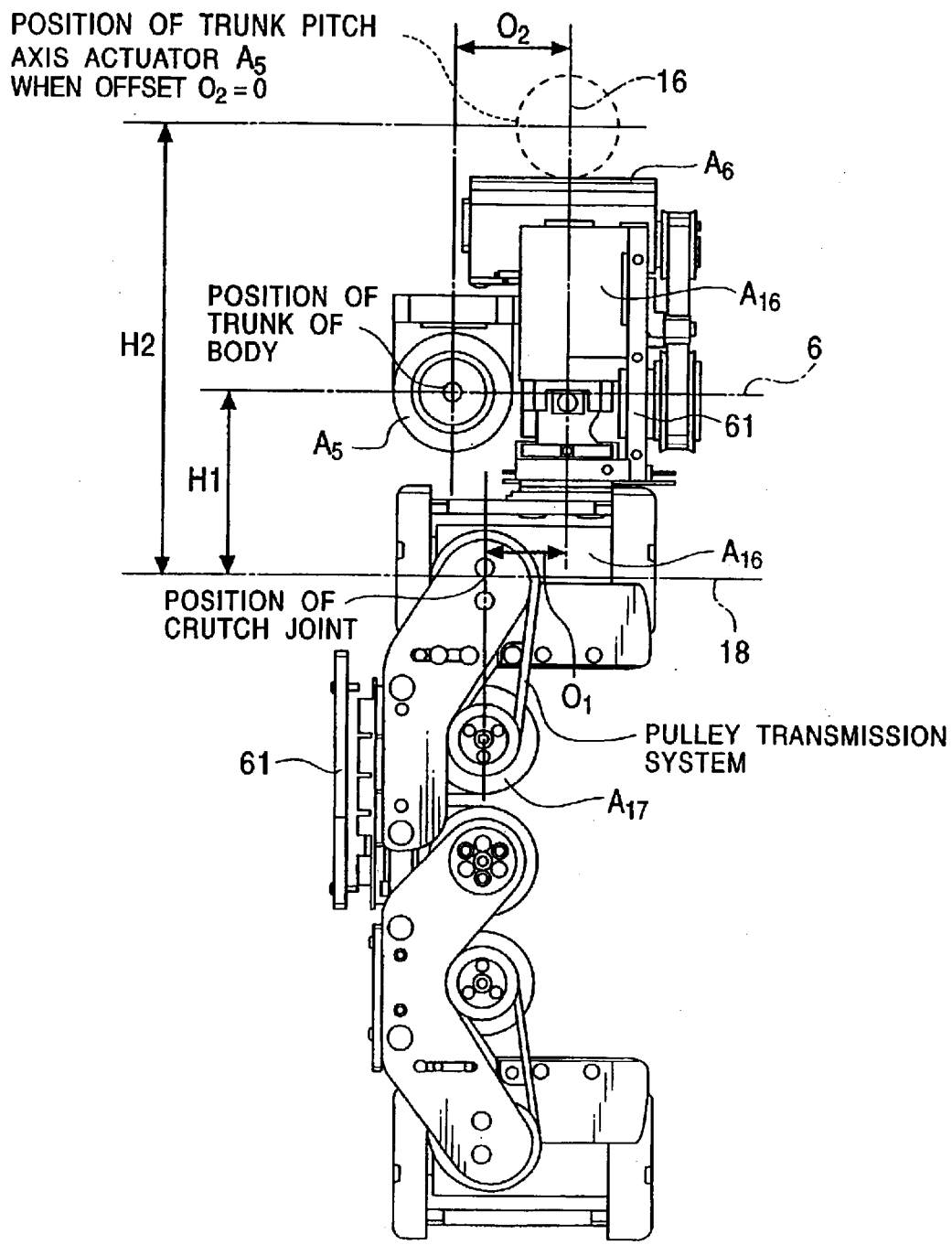
FIG. 8 is an enlarged view of the hip and a thigh section of the humanoid robot 100 when viewed from the sagittal plane.
Figure 9:
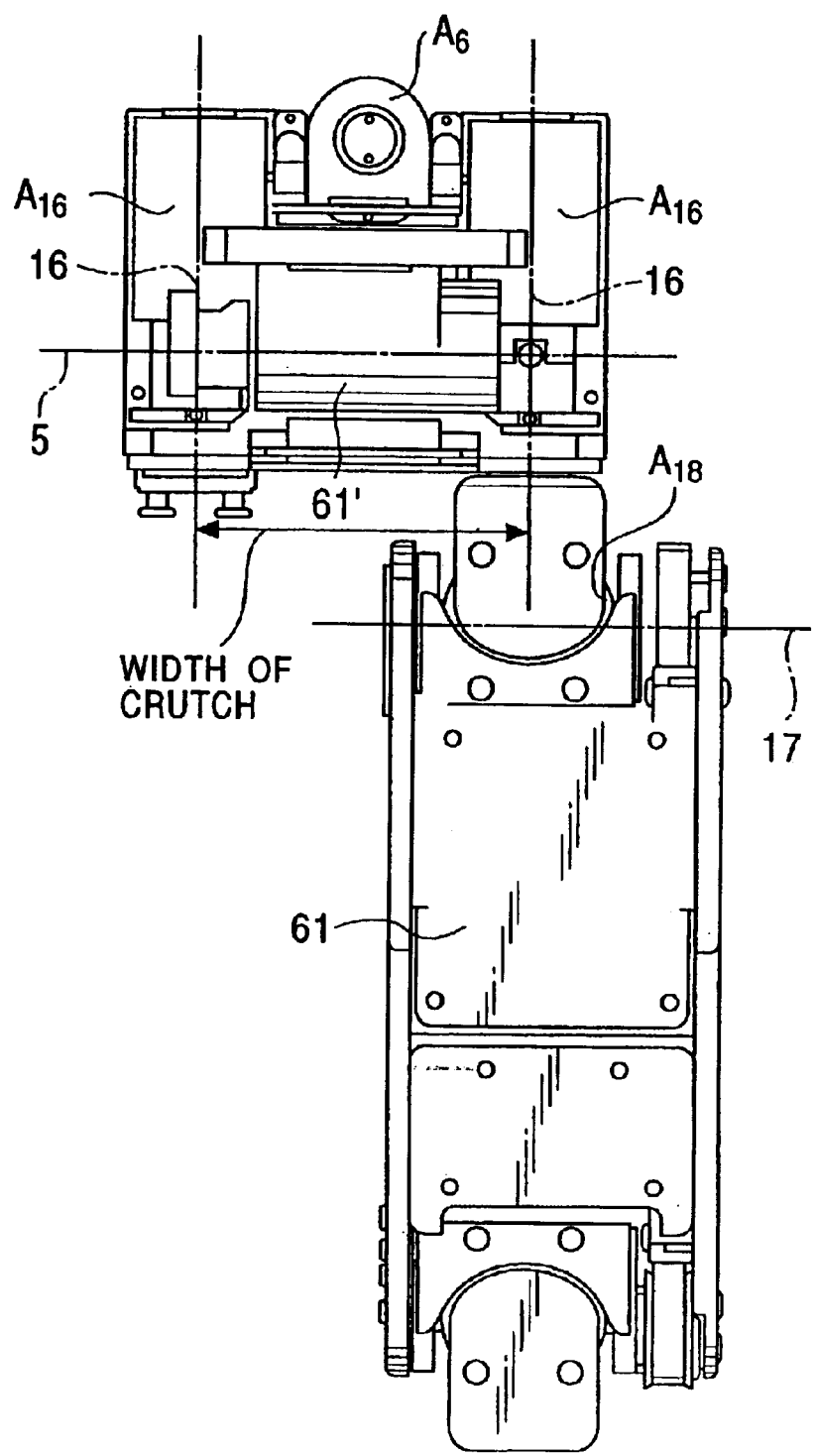
FIG. 9 is an enlarged view of the hip and the thigh section of the humanoid robot 100 when viewed from the front plane.

FIG. 8 is an enlarged view of the hip and the thigh section of the humanoid robot 100 when viewed in the sagittal plane. FIG. 9 is an enlarged view of the hip and the thigh section of the humanoid robot 100 when viewed from the front plane.

As shown in FIGS. 8 and 9, a hip joint pitch actuator $A_{17}$ and a hip joint roll axis actuator $A_{18}$ are mounted onto a thigh unit 61. Each hip joint yaw axis actuator $A_{16}$ is mounted onto a bracket (a pelvis at the trunk side) 61'.

In the conceptual diagram of FIG. 5, the hip joint pitch axis 17 and the hip joint roll axis 18 intersect at right angles to each other. However, actually, the actuators $A_{17}$ and $A_{18}$ which have a large volume cannot be disposed so that their axes of rotation intersect at right angles to each other. Accordingly, in the embodiment, as shown in FIGS. 8 and 9, the robot 100 is constructed so that the actuator $A_{17}$ which includes one of the axes that intersects at right angles is disposed away from the pitch axis 17, and so that the driving power is transmitted to the pitch axis 17 by a pulley transmission system in order to make the pitch axis and the roll axis intersect each other.

As can be seen from FIG. 8, in the humanoid robot 100 of the embodiment, an offset $O_1$ of a hip joint yaw axis 16 from its corresponding hip joint location, and an offset $O_2$ of the location of the trunk from the hip joint yaw axis 16 are set.

As already discussed, weight balancing and the controlling of the posture can be easily carried out by providing the offsets $O_1$ and $O_2$.

When a trunk pitch axis actuator $A_5$ is disposed in the location as shown in FIG. 8, the distance between the corresponding trunk roll axis 6 and the corresponding trunk joint roll axis 18 becomes $H_1$. On the other hand, when the offset $O_2$ is not set, that is, when the offset $O_2$ is zero, the trunk pitch axis actuator $A_5$ can only be disposed at the location marked by dotted lines in FIG. 8. As a result, the distance between the trunk roll axis 6 and the hip joint roll axis 18 is increased to $H_2$ as shown in FIG. 8. This means that the height of the waist of the humanoid robot 100 becomes larger, so that whole humanoid robot 100 is not longer well proportioned. Conversely speaking, by setting the offset $O_2$ as in the embodiment, the whole humanoid robot 100 can be kept well proportioned.

Figure 10:
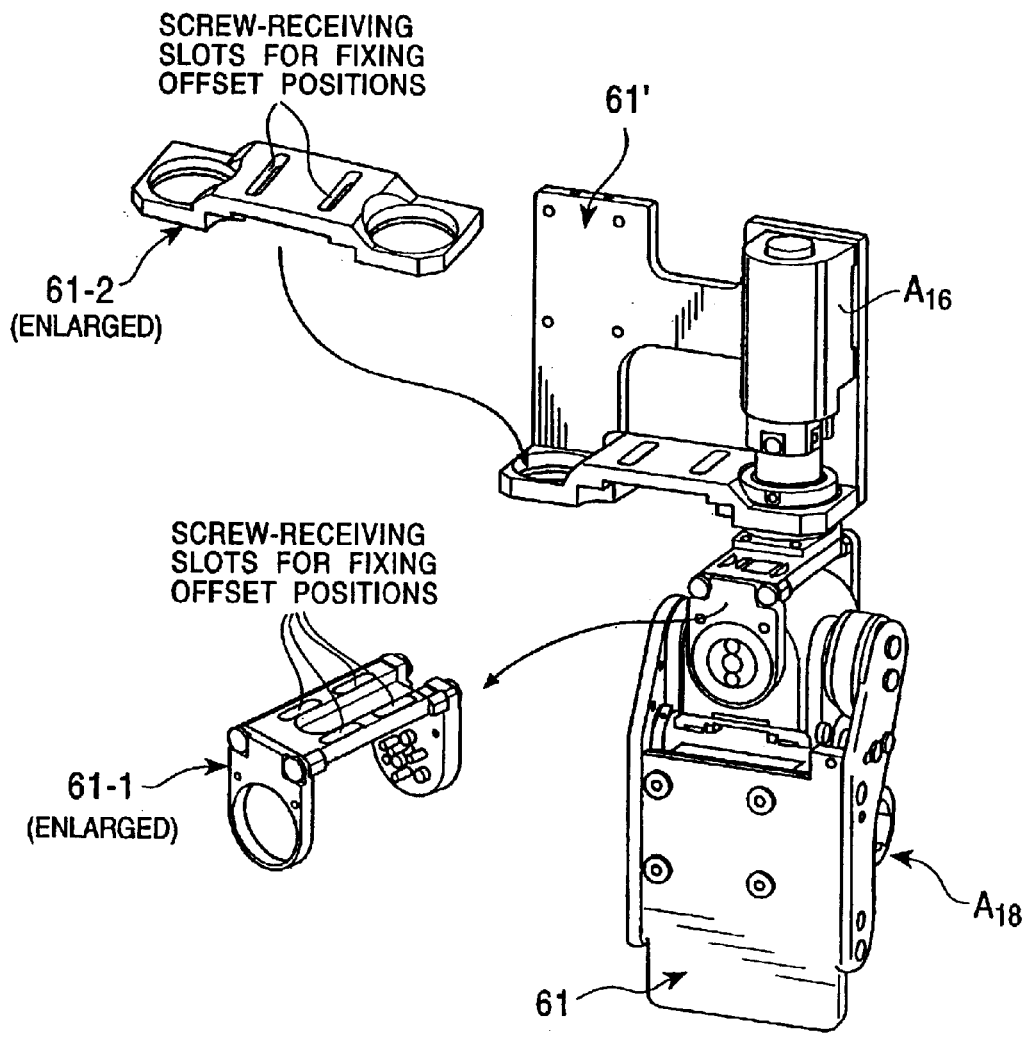
FIG. 10 illustrates a mechanism for offsetting a hip joint yaw axis 16.

FIG. 10 is an enlarged view of mounting parts around the hip joints.

As described above, the hip joint pitch axis actuators $A_{17}$ and the hip joint roll axis actuators $A_{18}$ are mounted onto the thigh units 61L and 61R. The hip joint yaw axis actuators $A_{16}$ are mounted onto the bracket (pelvis at the trunk side) 61'. As shown in FIG. 10, the thigh unit 61 and the bracket (pelvis at the trunk side) 61' are screwed through four threaded holes in a hip joint variable mounting section 61-1. As shown in FIG. 10, the threaded holes are in the form of slots which extend in the offset direction, so that the offset location of the hip joint yaw axis 16 from its corresponding lower limb can be freely set in accordance with the locations of screwing.

Figure 11:
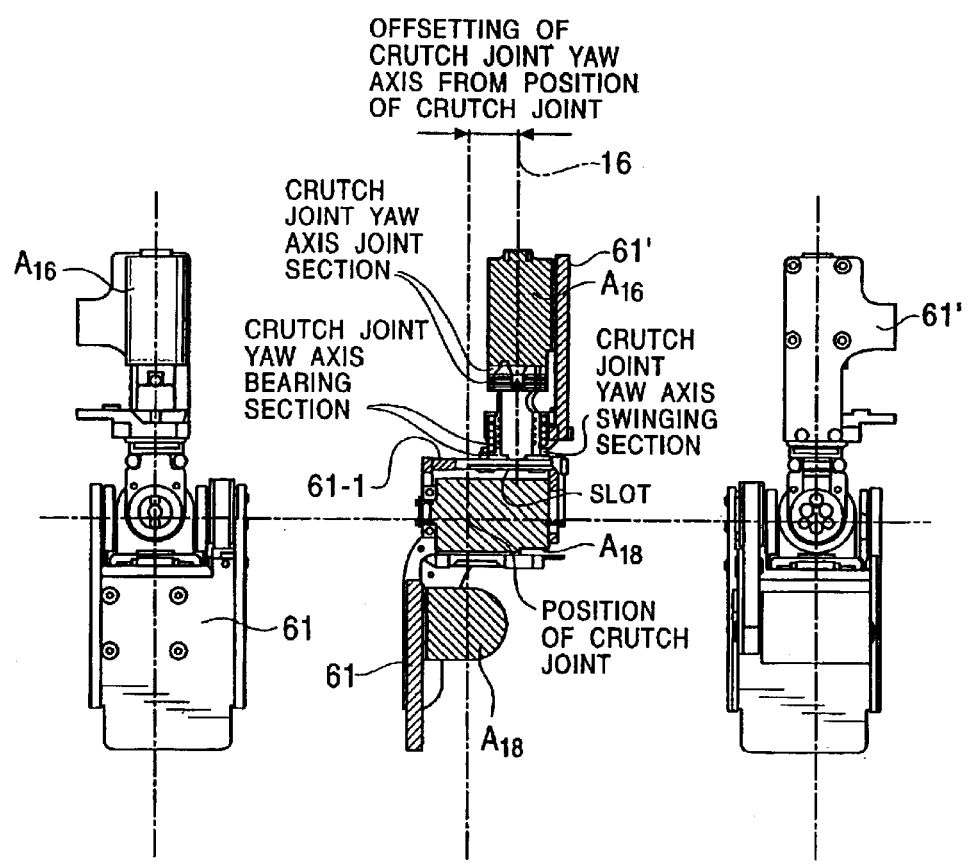
FIG. 11 is a sectional view showing a state in which a screwing operation has been performed at a location where a hip joint yaw axis 16 is maximally offset from a lower limb in the roll axis direction.

FIG. 11 is a sectional view showing a state in which a screwing operation has been performed at a location where a hip joint yaw axis 16 is maximally offset from the corresponding lower limb in the roll axis direction.

The trunk unit 40 (not shown in FIG. 11) and the bracket (pelvis at the trunk side) 61' are screwed through four threaded holes of a trunk variable mounting section 61-2. As shown in FIG. 11, since the threaded holes are in the form of slots which extend in the offset direction, the offset location of the hip joint yaw axis 16 with respect to its corresponding upper limb can be easily set in accordance with the screwing locations.

The present invention has been described in detail with reference to a particular embodiment of the present invention. However, it is obvious that modifications and substitutions may be made by those skilled in the art without departing from the gist of the present invention.

In the description of the specification, for convenience sake, the point of intersection of the trunk pitch axis 5 and the trunk roll axis 6 is defined as the location of the trunk, and the point of intersection of a hip joint pitch axis 17 and a trunk joint roll axis 18 is defined as the location of a hip joint. However, the meanings of the phrases "the location of the trunk" and "the locations of the hip joints" are to be flexibly interpreted by comparing the body mechanisms, such as the joint structures, of an actual human being and those of the humanoid robot 100. Similarly, the meaning of the term "body axis" which means the vertical center axis of the body is to be flexibly interpreted.

The gist of the present invention is not necessarily limited to a robot. In other words, the present invention may be similarly applied to any product, such as a toy, belonging to other industrial fields as long as the product is a mechanical device which moves in such a way as to emulate the movement of a human being by the use of electrical and magnetic actions.

In short, the embodiment used to disclose the present invention has been described for illustrative purposes only. Therefore, it is to be understood that the present invention is not limited thereto. In order to determine the gist of the present invention, one should refer to the claims of the present invention.

Figure 15:
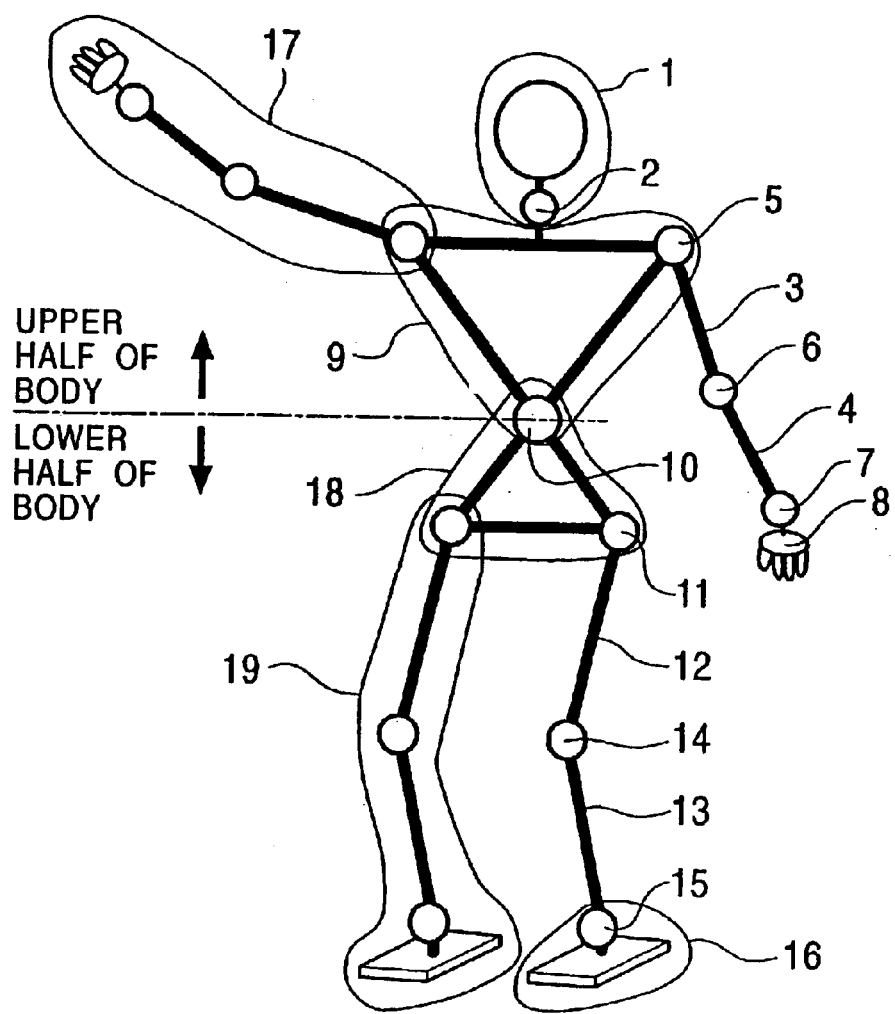
FIG. 15 is a schematic view of the structure of the joint model of a humanoid robot.

For reference, a joint model structure of a humanoid robot is illustrated in FIG. 15. In the joint model structure shown in FIG. 15, the section of the robot which extends from shoulder joints 5 to hands 8 so as to include upper arms 3, elbow joints 6, front arms 4, and wrist joints 7 is called upper limb section 17. The section of the robot which extends from the shoulder joints 5 to trunk joints 10 is called a trunk 9, which corresponds to the trunk of a human being. The section of the robot which extends from hip joints 11 to the trunk joint 10 is called waist 18. The trunk joint 10 acts to produce the degrees of freedom that the backbone of a human being possesses. The section of the robot comprising parts below the hip joints 11, that is, thighs 12, knee joints 14, lower crura 13, ankle joints 15, and feet 16 is called lower limb section 19. In general, the part of the body above the trunk joint 10 is called the upper part or upper half of the body, whereas the part of the body below the trunk joint 10 is called the lower part or lower half of the body.

Figure 16:
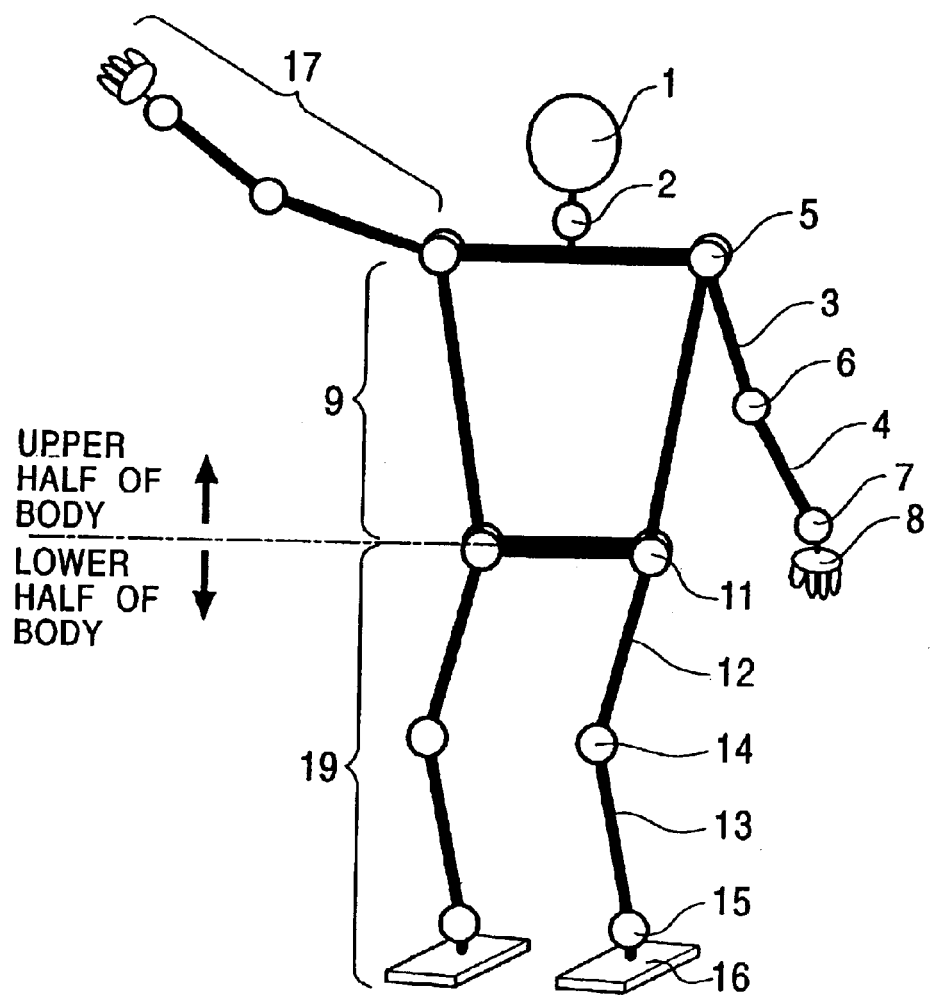
FIG. 16 is a schematic view of the structure of another joint model of a humanoid robot.

Another joint model structure of a humanoid robot is illustrated in FIG. 16. This joint model structure shown in FIG. 16 differs from that shown in FIG. 15 in that it does not possess the trunk joint 10. (Refer to FIG. 16 for the names of the different parts of the humanoid robot.) Since the humanoid robot does not include the trunk joint which corresponds to the backbone of a human being, the movement of the upper part of the humanoid robot cannot be moved like a human being. However, when an industrial humanoid robot for carrying out dangerous tasks or for carrying out tasks in place of human beings is used, the industrial humanoid robot is sometimes not constructed so as to move the upper part of its body. The reference numerals used in FIGS. 15 and 16 do not correspond to those in the figures other than FIGS. 15 and 16.

As can be understood from the foregoing description, according to the present invention, it is possible to provide an excellent humanoid robot having a structure which emulates the mechanisms and the movements of the human body.

According to the present invention, it is possible to provide an excellent leg-movement-type humanoid robot which walks on two feet, and which includes what is called the upper half of the body formed on the legs, including the trunk, the head, and the arms.

According to the present invention, it is also possible to provide an excellent humanoid robot which can move naturally in a way close to that of a human being and in a way sufficiently indicative of emotions and feelings with considerable fewer degrees of freedom than the human body.

The humanoid robot of the present invention is a leg-movement-type robot which walks on two feet using the lower limbs and which comprises upper limbs, lower limbs, and a trunk. In the humanoid robot, the hip joints which join the lower limbs and the trunk possess degrees of freedom produced by their corresponding hip joint yaw axes, their corresponding hip joint roll axes, and their corresponding hip joint pitch axes. The hip joint yaw axes can be arbitrarily offset in the roll axis direction.

Therefore, it is possible to flexibly balance the weights of the upper and lower limbs by accommodating to the effects of the movement of the center of gravity occurring as a result of changing the mode of use of the robot.

By offsetting the hip joint yaw axes, the height of the waist, that is, the length of the portion of the robot corresponding to the waist can be decreased, so that it is made more compact in size, making it possible to form a humanoid robot whose various mechanical units are dimensionally proportioned with respect to each other, that is, a humanoid robot having an external appearance which is close to the natural form of the human body.

When the hip joint yaw axes are offset from their corresponding hip joint locations in the backward direction or in the direction opposite to the direction of movement, the center of gravity of the humanoid robot is situated forwardly of the hip joint yaw axes. Therefore, in order to ensure stability in the pitch direction, the left and right ankles are disposed behind the centers of the corresponding feet. In this case, even if one of the hip joint yaw axis is rotated to change the direction of the corresponding foot, interference between the left and right feet (such as the striking of the heel of one of the feet with the other foot as shown in FIG. 6) can be reduced.

The humanoid robot can faithfully emulate the basic movements of a human being which walks on two feet, the basic movements being based on a forwardly tilted posture.

By performing an offsetting operation in order to move the location of the center of gravity of the entire robot slightly forward, the robot can easily balance itself it terms of its weight while walking or moving.

What is claimed is:

1. A legged walking robot comprising:
   a trunk which has at least a trunk pitch axis and a trunk roll axis which intersect each other;
   lower limbs which are connected to the trunk;
   a hip joint means which connects the lower limbs and the trunk, said hip joint means having has at least a hip joint roll axis and a hip joint pitch axis which intersect each other; and
   wherein the hip joint pitch axis is offset rearwardly longitudinally from the trunk pitch axis in the direction of either of the trunk roll axis or the hip joint roll axis.

* * * * *

UNITED STATES PATENT AND TRADEMARK OFFICE
CERTIFICATE OF CORRECTION

PATENT NO. : 6,917,175 B2
DATED : July 12, 2005
INVENTOR(S) : Hattori et al.

It is certified that error appears in the above-identified patent and that said Letters Patent is hereby corrected as shown below:

<u>Title page,</u>
Item [75], Inventors, should read:
-- Yuichi Hattori, Chiba; Yoshihiro Kuroki, Kanagawa; Tatsuzo Ishida, Tokyo; Jinichi Yamaguchi, Tokyo, all of (JP) --.

Signed and Sealed this

Fifteenth Day of November, 2005

JON W. DUDAS
*Director of the United States Patent and Trademark Office*